May 4, 1965  W. E. MEYER  3,182,273
EXTENSIBLE LINE HAVING CONSTANT ELECTRICAL LENGTH
Filed Sept. 20, 1963
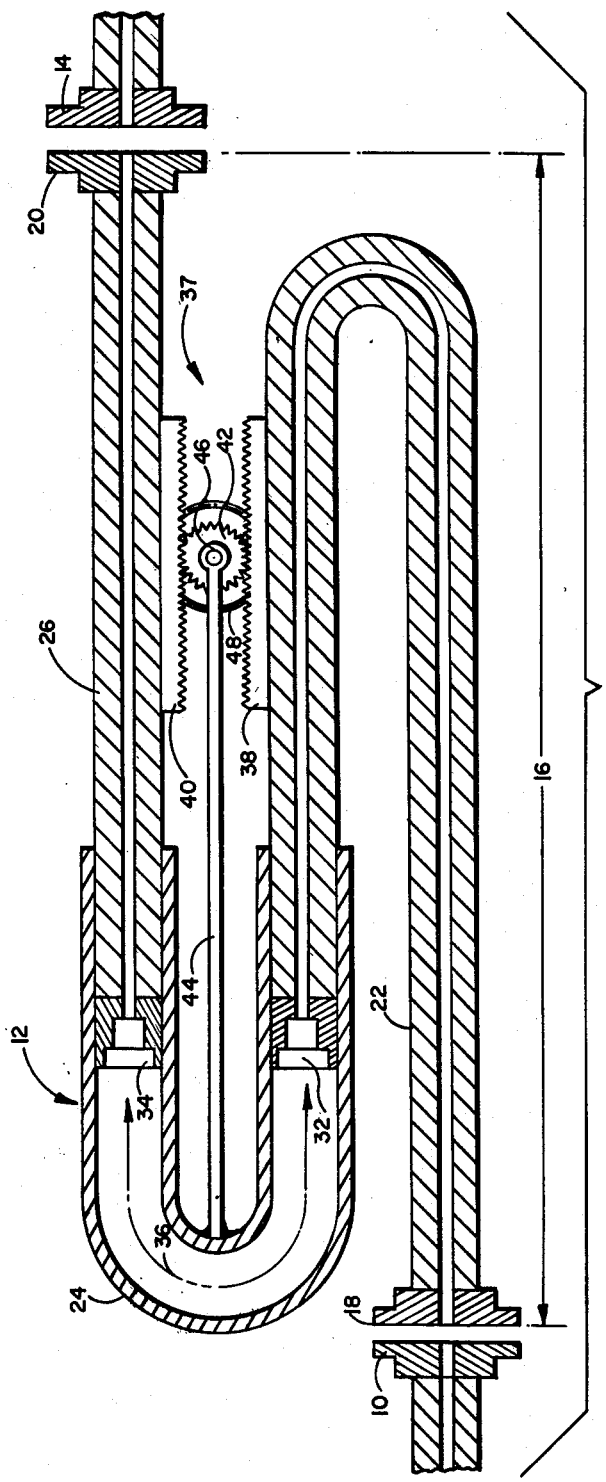
INVENTOR.
WILLIAM E. MEYER
BY
Sidney Magnell
AGENT United States Patent Office 3,182,273
Patented May 4, 1965

3,182,273
EXTENSIBLE LINE HAVING CONSTANT
ELECTRICAL LENGTH
William E. Meyer, Buena Park, Calif., assignor to
North American Aviation, Inc.
Filed Sept. 20, 1963, Ser. No. 310,386
3 Claims. (Cl. 333—98)

This invention relates to a conductor for electrical energy; and more particularly to such a conductor that can be either "stretched" or "shortened" to vary its physical length, while still maintaining a constant "electrical" length.

Background

Electrical energy of the microwave type is generally conducted from place to place through "waveguides"; these generally taking the form of hollow metallic tubing that is either rectangular or circular, and of predetermined dimensions that depend upon the wavelength of the energy being conducted.

The above-described conductor of microwave energy generally comprises waveguide sections that are bolted together to form microwave "plumbing" that is relatively rigid and inflexible. This plumbing is then used to connect various pieces of equipment, for example an antenna and a receiver; an antenna and a transmitter; a radar set and test equipment; power supplies and operating equipment; etc.

Generally, these pieces of equipment are spaced apart by a distance that may range from a few inches to several hundred feet; and even in two supposedly-identical installations, the actual distances between identical pieces of equipment may differ by as much as a couple of inches to a couple of feet.

Since the previously-described plumbing is rigid, it is desirable to have a "line-stretcher" whose overall physical length may be either stretched or shortened to satisfy the particular spatial relation between the separate pieces of equipment at each particular installation.

Another instance where the spacing may vary from moment to moment is the case where some equipment may be aboard a ship, while test equipment may be on shore or on a pier. Here it is essential that the plumbing that connects the equipment and the test equipment should be able to vary in length in accordance with the bobbing of a ship or the effect of tides.

Unfortunately however, when an electrical conductor is lengthened physically, it is also lengthened "electrically." This may be understood from the following discussion.

Assume that in an electrical conductor of a given length, an aliquot number of wavelengths will fit between the two ends of the conductor. If the conductor should be physically lengthened, or shortened, an aliquant number of wavelengths will now fit between the two ends of the conductor. Thus, the electrical length has been changed, and has introduced a phenomenon known as a "phase-shift," which may disturb the operation of the equipment.

It is therefore desirable to be able to change the physical length of the electrical conductor, while maintaining the same electrical length, in order to avoid the disturbing effects introduced by undesired phase-shift.

Objects and drawings

It is therefore the principal object of the invention to provide an improved electrical conductor whose physical length may be varied, while its electrical length remains constant.

The achievement of this object and others will be realized from the following specification, taken in conjunction with the single drawing which is a symbolic cross-sectional view of a line-stretcher.

Description of the invention

The basic inventive concept will be understood from the drawing. Here microwave energy is to be transmitted from an input connector 10, through an electrical conductor 12, to an output connector 14; the requirement being that the physical distance 16 between the input and output terminations 18 and 20 of conductor 12 be variable, while the electrical distance between input and output terminations 18 and 20 be constant.

Line-stretcher 12 causes the electrical energy from input termination 18 to follow an S-shaped path in order to reach output termination 20. As may be seen, line-stretcher 12 comprises three elements; an input waveguide 22; a U-shaped intermediate wave guide 24; and an output waveguide 26—the outer ends of input and output waveguides 22 and 26 having terminations 18 and 20 that mate with, and may be bolted to, input and output connectors 10 and 14 respectively.

The inner ends of input and output waveguides 22 and 26 terminate in wideband impedance-matching units 32 ad 34 respectively, these units being well known to those skilled in the art, and being slidable in intermediate waveguide element 24 to provide electrical continuity.

In operation, the electrical energy enters the line stretcher 12 at connector 18; and traverses the length of input waveguide 22, this length being a fixed value, say L1. Upon leaving the impedance macthing unit 32, the electrical energy traverses the U-shaped intermediate waveguide 24; its electrical path being indicated by the double-headed arrow 36, this length being L2. The electrical energy then enters the impedance matching unit 34, and traverses the output waveguide 26, which has a length L3.

Thus, the total electrical length is L1+L2+L3; while the physical length is the distance indicated by reference character 16.

The three elements 22, 24, and 26 of the line stretcher 12 are interconnected by means of a double-rack-and-pinion arrangement 37. This comprises a first, lower, toothed-rack 38 affixed to waveguide 22; a second, upper, toothed-rack 40 affixed to waveguide 26; and a pinion-gear 42 that intermeshes with the teeth of the lower and upper racks 38 and 40. A connecting rod 44 has one end pivotably coupled to the shaft of pinon-gear 42 by means such as a yoke 46; while the other end of the connecting rod 44 is affixed, by means, such as welding, to the intermediate waveguide 24.

Operation of the invention

The change of physical length is accomplished as follows. Assume, for simplicity, that input connector 10 and input termination 18 are coupled together to one piece of equipment on a pier, and that output connector 14 and output termination 20 are coupled together to another piece of equipment on a ship. Assume further, that the ship and the composite output connector-termination 14, 20 moves two inches to the right. Thus, there is a rightward "differential-movement" of two inches.

Since the upper waveguide 26, and its affixed rack 40, moves two inches to the right while the lower waveguide 22, and its affixed rack 38, is stationary, pinion gear 42 rotates clockwise. Due to the inherent operation of the double rack-and-pinion arrangement, it detects the differential-movement; and the shaft of the pinion gear moves rightward one-half of the differential-movement; that is, it moves a compensatory distance of one inch to the right. Therefore the connecting-rod 44 also moves the compensatory distance of one inch to the right; and, since one end of rod 44 is affixed to the intermediate waveguide 24, the intermediate waveguide 24 also moves the compensatory distance of one inch to the right.

The situation at the upper impedance-matching unit 34 is as follows. It has moved two inches to the right. The intermediate waveguide 24 has moved the compensatory distance of one inch to the right. Therefore, the change of length at impedance-matching unit 34 is an increase of two inches minus a decrease of one inch for a net increase of one inch.

The situation at the lower impedance-matching unit 32 is as follows. Since input waveguide 22 had not moved at all, but the intermediate waveguide 24 has moved the compensatory distance of one inch to the right, the length at impedance matching unit 32 has been decreased one inch.

Since the path through intermediate section 24 has been decreased one inch at its lower end, and increased one inch at its upper end, its overall length—because of the compensatory movement—is exactly the same as before the differential-movement occurred.

Thus, the physical length has been increased two inches; but electrical length is still L1+L2+L3; and all of these lengths are exactly the same as before the differential-movement occurred.

Hence, the physical distance between the terminations 18 and 20 has increased two inches; but the electrical length between these terminations has not been changed.

Had the ship moved two inches to the left, the differential-movement between the waveguides would have been a leftward two inches. Under this condition, the pinion-gear 42 would have rotated counterclockwise; and the compensatory-movement of the intermediate waveguide would have been half of the differential-movement, or one inch to the left. The result would have been to shorten the path at impedance-matching unit 34 by two inches minus one inch, for a decrease of one inch.

Simultaneously, the intermediate waveguide's compensatory leftward movement of one inch would have increased the path length at impedance-matching unit 32 by one inch.

Thus the one-inch increase compensates for the one-inch decrease, to maintain a constant electrical length while the physical length changed.

Under other conditions, the two terminations might each have moved one-inch toward each other, so that the distance between them was shortened two inches. This symmetrical differential-movement would have caused the pinion-gear to rotate counterclockwise, while remaining at the same location. As a result, the path-length at the upper impedance-matching unit 34 would have decreased one inch, while the path-length at the lower impedance-matching unit 32 would have increased one inch; the compensatory movement again maintaining a constant electrical length while the physical length changed.

In this way the ends of the line-stretcher 12 may be separated or brought closer together; but the electrical-length between its two terminations remains constant, regardless of the physical separation of the terminations.

Therefore, the disclosed device provides an electrical conductor of variable physical length, but of constant electrical length; thus obviating any phase-shift.

The above explanation has been presented in terms of separating the terminations of the line-stretcher; but the same result can be achieved by rotating pinion-gear 42 by means such as a knob 48.

The disclosed double-rack-and-pinion arrangement is, of course, only one way to obtain the desired compensatory movement. Other arrangements such as differential gears, differential screws with suitable threads, sliding members, etc., may alternatively be used.

In some installations the input and output connections 10 and 14 are alined. Under this condition, one or both of the waveguides 22 and 26 may be curved in such a manner that the terminations 18 and 20 are also alined; whereupon the terminations 18 and 20 may mate with the connectors 10 and 14.

There are times when microwave energy is conducted from place-to-place by so-called "coaxial" conductors, which generally comprise a central wire surrounded by a concentric tubing or sheath of electrically-conductive material. At other times, microwave energy may be conducted by a so-called "twin-lead" conductor, which comprises two parallel wires, which—in some cases—are encased in the longitudinal portions of a plastic ribbon.

While the above explanation has been conducted in terms of rigid microwave plumbing having slidable portions, the same inventive concept may be used with coaxial and twin-lead conductors. In those cases, the wires and sheath may be made slidable by means of adjustable line sections, such as Type 874 manufactured by General Radio Company, West Concord, Massachusetts.

The above inventive concept is useful not only with electrical energy in the microwave spectrum, but also with electrical energy in any frequency spectrum that admits the use of transmission lines or transmission-line concepts.

Although the invention has been illustrated and described in detail, it is to be clearly understood that the same is by way of illustration and example only and is not to be taken by way of limitation, the spirit and scope of this invention being limited only by the terms of the appended claims.

I claim:

1. The combination comprising
   an input waveguide;
   an output waveguide;
   a U-shaped intermediate waveguide in slidable electrical continuity with said input and output waveguides;
   a first toothed rack affixed to said input waveguide;
   a second toothed rack affixed to said output waveguide, and positioned opposite said first rack;
   a pinion gear positioned to intermesh with the toothed portions of said first and second racks;
   a connecting rod having one end pivotally attached to said pinion gear, and having the other end affixed to said U-shaped intermediate waveguide—whereby differential movement of said input and output conductors causes said pinion gear to produce a compensatory movement equal to half said differential movement, and said connecting rod transmits said compensatory movement to said intermediate conductor to maintain a constant electrical length therethrough.

2. The combination comprising
   a first waveguide;
   a second, U-shaped waveguide;
   a U-shaped intermediate waveguide;
   means, comprising impedance-matching units, for providing slidable electrical continuity with said first, second, and intermediate waveguides to produce an S-shaped electrical path;
   a first toothed rack affixed to said first waveguide;
   a second toothed rack affixed to said second waveguide, and positioned opposite said first rack;
   a pinion gear positioned to intermesh with the toothed portions of said first and second racks;
   a connecting rod having one end pivotally attached to said pinion gear, and having the other end affixed to said U-shaped intermediate waveguide—whereby differential movement of said input and output conductors causes said pinion gear to produce a compensatory movement equal to half said differential movement, and said connecting rod transmits said compensatory movement to said intermediate conductor to maintain a constant electrical length therethrough.

3. A waveguide assembly of adjustable overall physical length and fixed electrical length, comprising
   a first and second rigid terminal waveguide section;

a U-shaped rigid intermediate waveguide section, each end of which slidably engages an end of a mutually exclusive one of said terminal sections to provide waveguide sections of adjustable lengths;

differential motion means coupled to said terminal sections and having an output member for providing a mechanical output motion relative to each of said terminal sections in response to differential motion occurring between said terminal sections, said output member being mechanically connected to said intermediate section, the magnitude of said relative motion maintaining the physical length along the U-shaped intermediate section and said terminal sections constant.

References Cited by the Examiner

UNITED STATES PATENTS 2,725,431   11/55   Rushworth _____ 191—12
2,951,217   8/60   Clapp _____ 333—98

OTHER REFERENCES

Aden and Britton: "A Microwave Waveguide Trombone Phase Shifter," Canadian Journal of Physics, vol. 34, 1956, pages 1112 to 1118.

HERMAN KARL SAALBACH, *Primary Examiner.*